(12) United States Patent
Ohashi et al.

(10) Patent No.: US 8,350,980 B2
(45) Date of Patent: Jan. 8, 2013

(54) LIQUID CRYSTAL DISPLAY APPARATUS WITH FLEXIBLE CABLE CONNECTING LIGHT SOURCE AND CIRCUIT BOARD

(75) Inventors: Shigeo Ohashi, Tsuchiura (JP); Noriyo Nishijima, Abiko (JP); Yoshiharu Yamashita, Yokohama (JP); Katsunari Sato, Toda (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 723 days.

(21) Appl. No.: 12/542,003

(22) Filed: Aug. 17, 2009

(65) Prior Publication Data

US 2010/0066939 A1 Mar. 18, 2010

(30) Foreign Application Priority Data

Sep. 18, 2008 (JP) ................................. 2008-238802

(51) Int. Cl.
*G02F 1/1333* (2006.01)
*G02F 1/1335* (2006.01)

(52) U.S. Cl. ................ 349/58; 349/61; 349/62; 349/64; 349/65

(58) Field of Classification Search .................... 349/58, 349/61, 62, 64, 65
See application file for complete search history.

(56) References Cited

U.S. PATENT DOCUMENTS

| 7,237,923 | B2 * | 7/2007 | Ono | 362/218 |
| 7,513,661 | B2 * | 4/2009 | Hamada et al. | 362/373 |
| 7,894,016 | B2 * | 2/2011 | Hamada | 349/58 |
| 2006/0243948 | A1 * | 11/2006 | Ishiwa et al. | 252/299.61 |
| 2007/0247564 | A1 * | 10/2007 | Takahashi | 349/65 |

FOREIGN PATENT DOCUMENTS

| CN | 1837909 | | 9/2006 |
| JP | 2006-208485 | | 8/2006 |
| JP | 2006-227427 | | 8/2006 |
| JP | 2006227427 A | * | 8/2006 |

* cited by examiner

*Primary Examiner* — Mike Qi
(74) *Attorney, Agent, or Firm* — Antonelli, Terry, Stout & Kraus, LLP.

(57) ABSTRACT

Provided is a liquid crystal display apparatus capable of avoiding heat radiation hindrance caused from blocking of a heat radiation path by electric wiring and from interference of the electric wiring with a radiating portion for heat generated from circuit boards, in which a heat diffusion member and the circuit boards including an LED driver substrate are arranged in a plane at the rear of a frame in a housing while being isolated from one another, and LED light sources mounted on metal blocks are connected to the LED substrate through a flexible cable which is led from the outsides of the metal blocks and the heat diffusion member and is then led between the heat diffusion member and a rear case.

8 Claims, 4 Drawing Sheets

LIQUID CRYSTAL DISPLAY APPARATUS WITH FLEXIBLE CABLE CONNECTING LIGHT SOURCE AND CIRCUIT BOARD

INCORPORATION BY REFERENCE

The present application claims priority from Japanese application JP2008-238802 filed on Sep. 18, 2008, the content of which is hereby incorporated by reference into this application.

BACKGROUND OF THE INVENTION

The present invention relates to a liquid crystal display apparatus capable of efficiently dissipating the heat which is generated in a housing.

These days, there have been prosperously used a luminescence type plasma display apparatus and a non-luminescence type liquid crystal display apparatus as a display unit, instead of a CRT (Cathode Ray Tube).

Of these display apparatuses, the liquid crystal display apparatus uses a liquid crystal panel serving as a transmission type light modulating element, and has an illumination device (hereinafter referred to "backlight device") located behind the liquid crystal panel for irradiating light onto the latter. Further, the liquid crystal panel controls the transmission factor of the light irradiated from the backlight device so as to create an image.

As one of the advantageous features, the liquid crystal display apparatus has an external shape which can be thin, in comparison with a CRT. However, these years, there have been demanded liquid crystal display apparatuses having a thickness which is further thin. The thinner the liquid crystal display apparatus, the harder the formation of air passages for dissipating heat generated in a housing which gives the external shape of the liquid crystal display apparatus, the heat cannot be efficiently dissipated, resulting in occurrence of a problem of increasing the temperature of a thermally weak part thereof. Thus, for instance, JP-A-2006-208485 proposes a construction in which LEDs (Light Emitting Diodes) are used as a light source in the backlight device in a side light type liquid crystal display apparatus, and in which a light source mounting substrate is connected to a heat radiation member for dissipating the heat produced from the LEDs.

However, in the liquid crystal display apparatus disclosed in JP-A-2006-208485, the light source mounting substrate (which is a flexible substrate) arranged between the LEDs and the heat radiation member causes a problem of hindrance of heat radiation. Further, although the LEDs are arranged in proximity with a circuit board, no consideration has been made of the affection of the heat generated from the circuit board upon the heat radiation from the LEDs.

Since the LEDs, which constitute a heat source in a liquid crystal display apparatus incorporating a backlight device using the LEDS, locally generate heat, heat radiation should be made after the heat is once diffused, and accordingly, the thermal transmission path from the LEDs to a heat diffusion member has to have a lower thermal resistance. As factors which hinder the heat radiation from the LEDs, there are enamulated the blockage of the thermal transmission path from the LEDs to the heat diffusion member by electric wirings, and the interference of heat generation from a circuit board with the LED heat radiating portion.

BRIEF SUMMARY OF THE INVENTION

The present invention therefore has an object of providing a liquid crystal display apparatus capable of avoiding the above-mentioned factors as to the hindrance of heat radiation and as well having a thin housing which can dissipate a heat generated therein with a high degree of efficiency.

The above object is achieved by a liquid crystal display apparatus comprising a housing case accommodating therein a liquid crystal panel, a backlight device incorporating a light source for illuminating the liquid crystal panel from the rear surface of the latter, a heat diffusion member thermally connected to the light source, a plurality of circuit boards, a frame for holding the backlight device, the heat diffusion member and the circuit boards, and flexible cables electrically connecting the light source to the circuit boards, wherein the heat diffusion member and the circuit boards are arranged at the rear surface of the frame, and the light source and the circuit boards are connected so that the flexible cables are led around from the outer surface of the heat diffusion member and are then led through a space between the heat diffusion member and the housing case.

Further, the above object is achieved by arranging the heat diffusion member and the plurality of circuit boards in substantially the same plane at the rear of the frame.

Further, the above object is achieved by connecting the flexible cable through a gap which is defined between the heat diffusion member and the housing case to extend in a direction along the rear surface of the liquid crystal display apparatus.

Further, the above object is achieved by a construction that the heat diffusion member is composed of a metal panel and a plurality of heat pipes which are thermally connected and fixed to the metal panel.

Further, the above object is achieved by a construction that the heat diffusion member is formed from a graphite planar member and is connected to the frame through the intermediary of a metal member.

Further, the above object is achieved by a construction that the rear surface of the liquid crystal panel is divided into a plurality of zones, and backlight devices each composed of a light source substrate mounted thereon with a light source, a light guide panel, a reflection sheet laid on the rear surface side of the light guide panel and a metal chassis for holding these components are arranged in these zones, respectively.

According to the invention, the liquid crystal display apparatus capable of restraining the temperature rise of LEDs used in the backlight device can be materialized with a thin housing.

Other objects, features and advantages of the invention will become apparent from the following description of the embodiments of the invention taken in conjunction with the accompanying drawings.

Reference Sign List: 1 . . . liquid crystal TV, 2 . . . frame, 5 . . . LED driver substrate, 5a, 11a, 56 . . . connector, 6 . . . flexible cable, 9 . . . liquid crystal panel, 10 . . . light guide panel, 11 . . . LED light source, 11a, 55 . . . LED, 11b, 53 . . . LED substrate, 12 . . . metal block, 13 . . . heat diffusion member, 14 . . . rear case, 18 . . . heat pipe, 50 . . . light source block, 52 . . . subchassis

DETAILED DESCRIPTION OF THE INVENTION

Explanation will be hereinbelow made of best modes for implementing the invention, with reference to the accompanying drawings.

Embodiment 1

Figure 1:
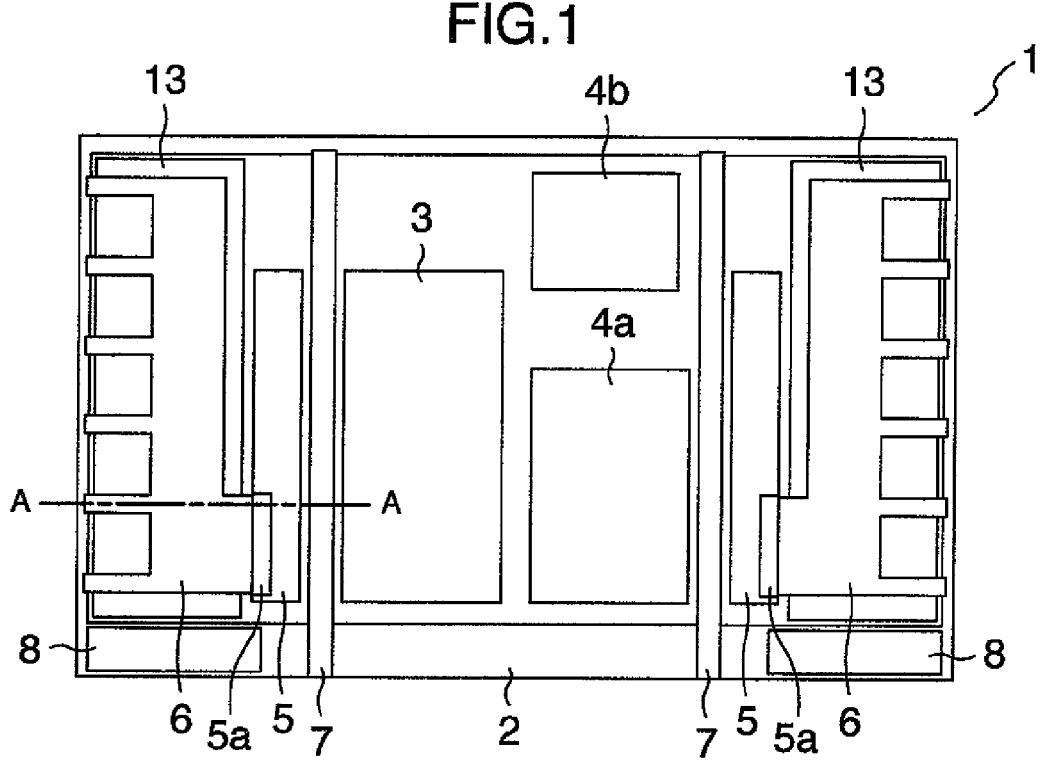
FIG. 1 is a plan view illustrating the interior of a liquid crystal display apparatus according to a first embodiment as viewed from the rear thereof.
Figure 2A:
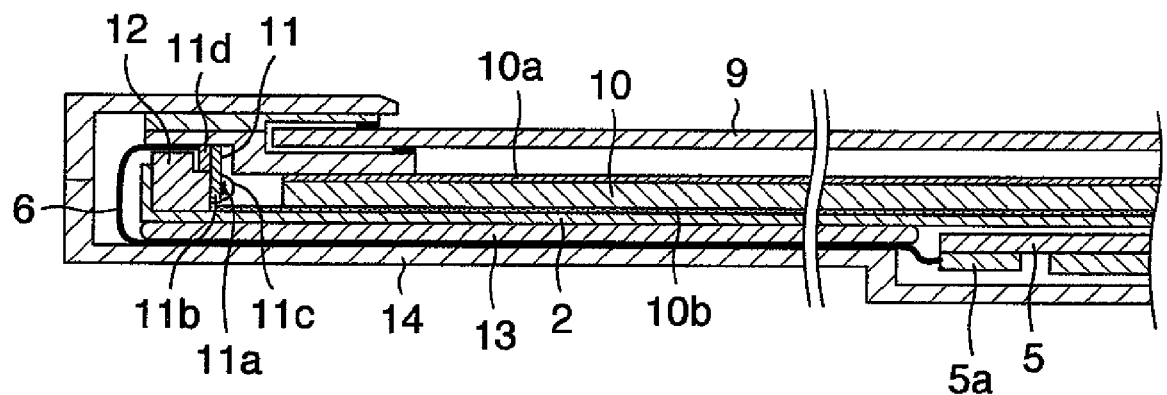
FIG. 2A is a sectional view along A-A in FIG. 1.

A liquid crystal TV, as an example of a liquid display apparatus in which the invention is applied is shown in FIGS. 1 and 2A, B.

FIG. 1 is the rear view showing the interior of the liquid crystal TV according to the first embodiment.

Figure 2B:
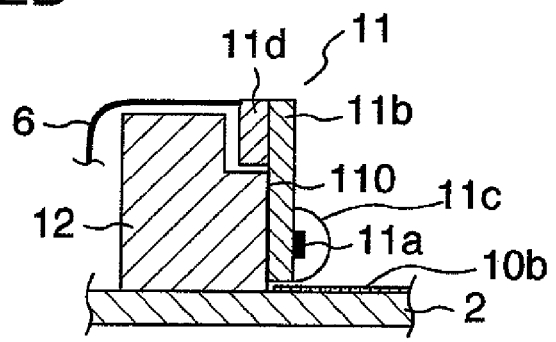
FIG. 2B is a enlarged sectional view illustrating an LED light source portion shown in FIG. 2A.

FIG. 2A is the partially enlarged sectional view along line A-A in FIG. 1, and FIG. 2B is the partially enlarged view illustrating an LED light source shown in FIG. 2A.

Referring to FIGS. 1 and 2A, the liquid crystal TV is equipped therein with back lights having side light type LEDs as light sources, and has, as shown in FIG. 1, a frame 2 incorporated therein, which is mounted at its rear with a light source substrate 3, circuit boards 4a, 4b for processing signals, the back lights disposed on opposite sides of the frame 2, a heat diffusion member 13 for radiating heat from the LEDs in the back lights, an LED driver substrate 5 for driving the LEDs, a flexible cable 6 connecting the LEDs to the LED driver substrate 5, and the like.

Further, there are provided stays 7 for ensuring the rigidity of the liquid crystal TV 1 and for attaching thereto a stand, a speaker 8 and the like. Further, as shown in FIG. 2A, the liquid crystal TV 1 incorporates a liquid crystal panel 9, a light guide panel 10 (made of a material such as a transparent acrylic plate and printed at its rear surface with a dot pattern for letting incident light out toward the liquid crystal panel) laid at the rear surface of the liquid crystal panel 9, for emitting light which has been incident upon the side surfaces thereof, toward the rear surface of the liquid crystal panel 2, a LED light source 11 laid at each side surface of the light guide panel 10 and serving as a light source for applying light to the liquid crystal panel 9, an optical sheet 10a for uniformly distributing the light emitted from the light guide panel 10 over the liquid crystal panel 9, a reflection sheet 10b for reflecting light emitted from the rear surface of the light guide panel 10 onto the liquid crystal panel 9, which are held by the frame 2 together with other components incorporated in the liquid crystal TV.

Further, as shown in FIG. 2B, the LED light source 11 is composed of an LED substrate 11b which is mounted thereon with the LEDs 11b and which is bonded to a metal block 12 with a thermal conductive adhesive 110, and the metal block 12 is attached to the end of the frame 2. The LED substrate 11b mounted thereon with the LEDs 11a is, for example, a ceramic circuit board or a circuit board provided with metal cores (such as copper cores) which thermally connect the front and rear surfaces of the substrate to each other in the LED mounting section. Further, the LEDs 11a are sealed by a lens 11c. Moreover, the heat diffusion member 13 is laid at the rear surface of the frame 2. The heat diffusion member 13 is extended in a planarwise direction of the liquid crystal TV 1, and is thermally connected at its end with the metal block 12. Thermal connection between the heat diffusion member 13 and the metal meta block 12 is made through the frame 2, and there may be interposed between their contact surfaces a thermal conductive sheet, grease, an adhesive or the like, as necessary (in this case, only the metal block 12 can sufficiently cover a required contact area).

Further, the metal block 12 may be partially extended through the frame 2 so as to be directly connected to the heat diffusion member 13. The heat diffusion member 13 is in the combination of a highly heat conductive planer member made of aluminum or graphite, and a plurality of heat pipes arranged horizontally on the planar member. Further, circuit boards located at the rear surface of the frame 2, such as the LED driver substrate 5 for driving the LEDs 11a, the power source substrate 3, the signal substrates 4a, 4b and the like, are arranged at positions nearer to the center side of the liquid crystal TV 1 than the position where the heat diffusion member 13 is arranged and in the same plane as the heat diffusion member 13, while being isolated from the latter.

Further, a rear case 14 is arranged on the rear surface sides of the heat diffusion member 13 and the circuit boards 5, 3, 4a, 4b including the LED driver substrate. The LED substrate 11b and the LED driver substrate 5 are electrically connected to each other by means of the flexible cable 6 through the intermediary of connectors 11d, 5a which are mounted respectively on these substrates. At this time, the flexible cable 6 is led around the outer surface sides of the metal block 12 and the heat diffusion member 13 and then is led through the gap between the heat diffusion member 13 and the rear case 14.

Each of the LED substrates 11b which are arranged at opposite side ends of the liquid crystal panel is divided into a plurality of zones, which are arrayed and mounted on the metal block 12 in a straight row. The respective LED substrate 11b zones are fed with electric powers from the LED driver 11 independently from each other and light quantities are controlled on the respective substrate 11b zones. The flexible cable 6 has lines for feeding power to the respective LED substrate 11b zones, which are configured to be bundled together in the vicinity of center parts thereof, as shown in FIG. 1, and are then connected to the connector 5a on the LED driver substrate. The smaller the area of the bundled part, the lower the thermal resistance from the heat diffusion member 13 to the rear case 14.

It is noted that should the LED substrate 11b and the LED driver substrate 5 be connected to each other at a shortest distance, the flexible cable 6 would pierce through the frame 2 and the heat diffusion member 13, resulting in local blockage of the thermal transmission path. Thus, the temperature of LEDs in this part would be raised up. Further, during assembling steps of the liquid crystal TV, the flexible cable 6 would be connected to the connector 11d on the LED substrate after the metal block 12 mounted thereon with the LED substrate 11b, the frame 2 and the heat diffusion member 13 are assembled together, and accordingly, the assembling efficiency would be remarkably lowered, resulting in increase in the manufacturing costs due to increase in the working time and man-hours. Further, there would be caused the hindrance that through holes which are formed in the frame 2 and through which the flexible cable 6 is led through, would deteriorate the rigidity of the frame although it depends upon the areas and shapes of the through-holes.

Figure 3A:
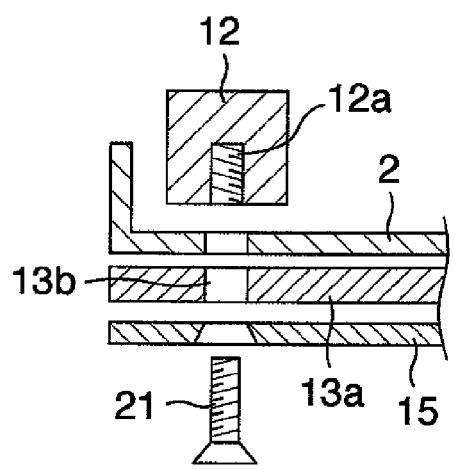
FIGS. 3A and 3B are exploded sectional views each illustrating components in an attachment portion of a heat diffusion member.
Figure 3B:
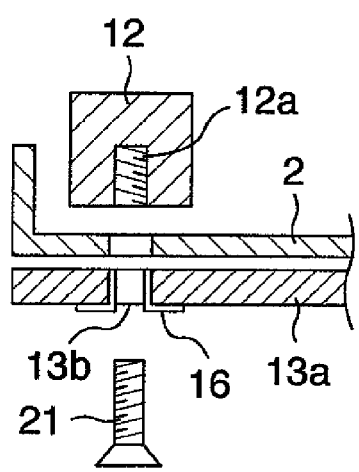

Referring to FIGS. 3A and 3B, explanation will be made of the attachment part of the heat diffusion member, as an example.

FIGS. 3A and 3B are the exploded sectional views illustrating components in the attachment part in the case of using a graphite plate as the heat diffusion member 13.

FIGS. 3A and 3B only show the meal block 12 mounted thereon with each LED substrate 11b, the frame 2 and the heat diffusion member 13. The heat diffusion member 13 is planar, having a thickness of about 1 to 3 mm, and the necessary thickness of the diffusion member 13 is determined depending upon the heat value of the LEDs and the allowable mounting area thereof. The metal block 12, the frame 2 and the graphite plate 13a (heat diffusion member) are fixed together with the use of, for example, a female thread 12a formed in the metal block 12 and through holes formed in the frame 2 and the graphite plate 13a by means of piercing screws 21. The through hole 13b in the graphite plate 13a has a peripheral wall surface which is fragile since the mother material of the graphite plate 13a is a graphite material, and accordingly, a required mechanical strength cannot be obtained by directly fastening the screw. Thus, as shown in FIG. 3A, a fixing plate 15 made of a metal or the like having rigidity is used for fastening the screw.

The fixing plate 15 may be made of thermally conductive metal such as aluminum, having a size corresponding to that of the graphite plate 13a so as to additionally have the thermal diffusion effect. Further, as shown in FIG. 3B, a flanged sleeve made of a high rigid material such as a metal may be fitted in the through holes 13b formed in the graphite plate 13a, and thereafter the graphite plate 3a is fastened to the frame 2 with the screw 21. Further, in view of a difference in thermal expansion coefficient between the frame 2 and the graphite plate 13a, it is desirable to avoid fixing the graphite plate 13a and the frame 2 in other parts than the above-mentioned fixed part, as necessary. Although in the examples shown in FIGS. 3A and 3B, the heat diffusion member is made of graphite having a heat conductivity and a specific weight which are both advantageous for the heat radiation member in the liquid crystal TV, it may be made of a thermal conductive metal such as aluminum or copper, which is excellent in strength in comparison with the graphite. In this case, the necessity of the reinforcement for the through-hole as stated above can be advantageously eliminated.

Figure 4A:
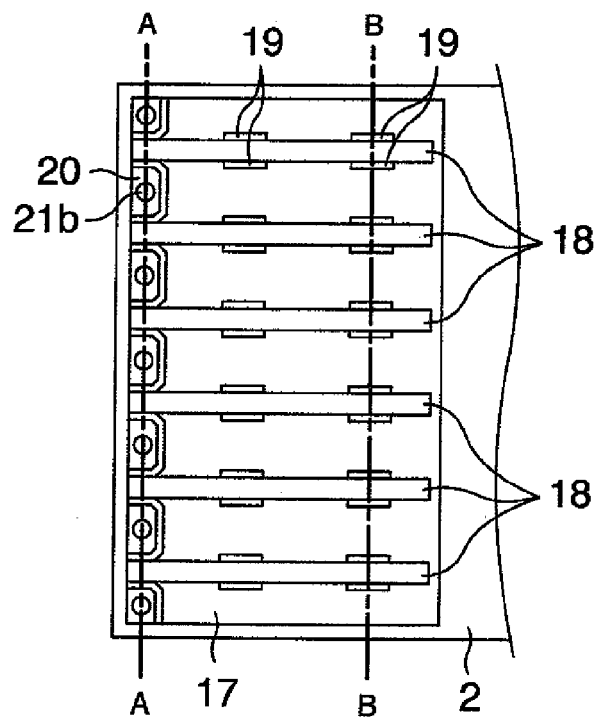
FIG. 4A is a view illustrating another example of the heat diffusion member.
Figure 4B:
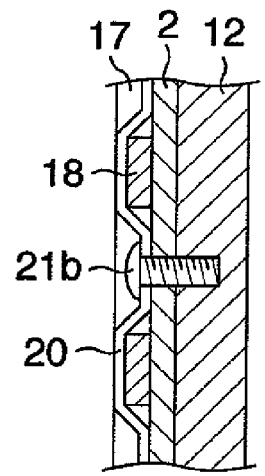
FIG. 4B is a sectional view along line A-A in FIG. 4A.
Figure 4C:
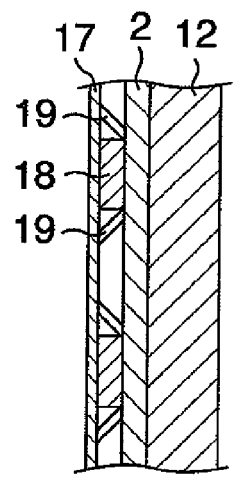
FIG. 4C is a sectional view along line B-B in FIG. 4A.

FIGS. 4A, 4B and 4C show another example of the heat diffusion member, wherein the heat diffusion member 13b is composed of a metal panel 17 such as an aluminum panel, and a plurality of flattened heat pipes 18 are fixed to the metal panel 17 in a substantially horizontal direction.

FIG. 4A shows the heat diffusion member 13b as viewed from the side on which it is attached to the frame 2.

FIG. 4B is the sectional view along line A-A in FIG. 4A, and FIG. 4C is the sectional view along line B-B in FIG. 4A.

In FIG. 4A, the metal plate 17 and the heat pipes 18 are fixed in such a way that the metal plate 17 is partially cut and raised as shown in the B-B section of FIG. 4C, and the heat pipes 18 are calked by cut and raised parts 19. The heat pipes 18 may be metallically secured with a solder or the like. On the other hand, at the ends (connection parts to the metal block 12), as shown in the A-A section of FIG. 4B, the end parts of the metal plate 17 are subjected to a drawing process 20 so as to wrap the ends of the heat pipes 18, and the metal plate 17 is fastened to the frame 2 and the metal block 12 by screws at the thus obtained parts 20 to fix both the metal plate 17 and the heat pipes 18 onto the frame 12.

With this configuration, in particular, the heat receiving parts at the ends of the heat pipes 18 can be thermally connected to the frame 2 in a satisfactory manner. With the use of the above-mentioned heat diffusion member 13b, heat generated from the LEDs can be diffused by means of the frame 2, the metal plate 17 and the heat pipes 18. In particular, the heat diffusion in the horizontal direction (the direction from the LED mounting part to the center of the liquid crystal TV) can be promoted by the heat pipes 18, and the heat diffusion effect can be exhibited with a high degree of efficiency, even though the size of the screen is enlarged to increase the horizontal distance. Further, the frame 2 and the metal plate 17 are connected through the heat pipes 18, and accordingly, the heat diffused by the frame 2 is radiated from the rear surface side through the metal plate 17 and the rear case 14.

According to the first embodiment, the flexible cable 6 is led from the outer surface sides of the metal block 12 and the heat diffusion member 13, and is then led between the heat diffusion member 13 and the rear case 14, and accordingly, the thermal transmission path from the LEDs 11a to the heat diffusion member 13 is not blocked by the flexible cable 6. Thus, the heat from the LEDs 11a is effectively transmitted to the heat diffusion member 13 and is diffused in the planarwise direction within the heat diffusion member 13. When the frame 2 made of a high thermo-conductive material such as aluminum, the heat diffusion effect is further improved and the rigidity of the liquid crystal TV 1 can be enhanced.

The heat generated from the LEDs 11a is transmitted to the rear case 14 after it is diffused in the heat diffusion member 13. Although the flexible cable 6 intervenes between the heat diffusion member 13 and the rear case 14, the heat from the LEDs 11a is transmitted through the flexible cable 6 after it is diffused in the heat diffusion member 13, and accordingly, the heat flux (a heat transmission value per unit area) passing through the flexible cable 6 has been less. Further, the flexible cable 6 has in general an extremely thin thickness such as about 0.1 mm, and heat radiation from the heat diffusion member 13 to the rear case 14 is not hindered.

The heat diffusion member 13 and the circuit boards are arranged in the plane at the rear of the frame 2 while being isolated from each other, and the heat generated from the circuit board does not interfere with the heat diffusion member 13, that is, it does not hinder the heat radiation from the heat diffusion member 13. Further, it is possible to determine the entire thickness of the liquid crystal TV 1, depending only upon the required thickness of the circuit boards, without taking into account of the thickness of the diffusion member 13 (since the heat diffusion member 13, even having a thin thickness in comparison with the thickness of the circuit boards, can exhibit a sufficient heat diffusion effect). Thus, the thinning of the liquid crystal TV can be materialized.

Subsequently, explanation will be made of the second embodiment with reference to FIGS. 5, 6, 7A and 7B. The second embodiment is a modification of the first embodiment, in which the light source part of the first embodiment is varied.

Embodiment 2

Figure 5:
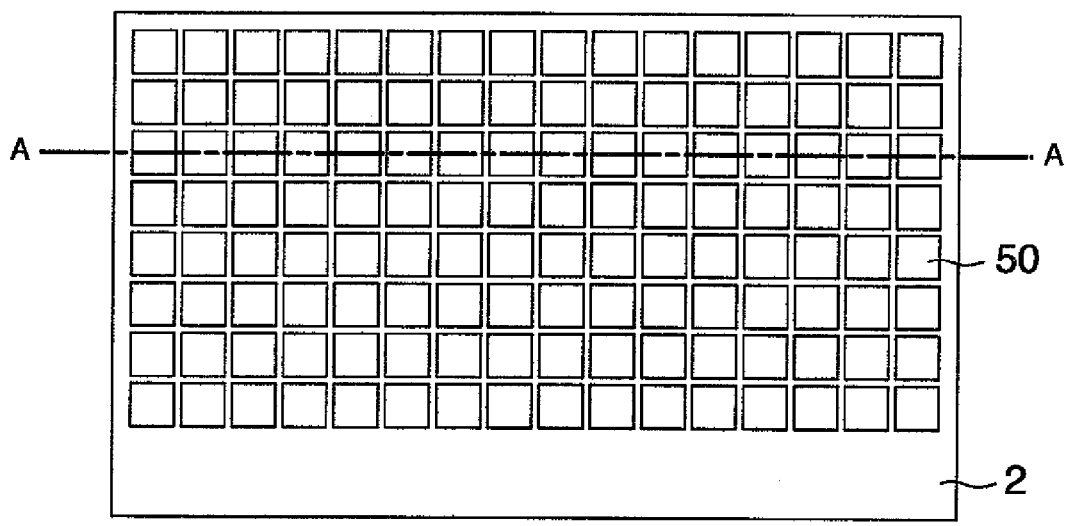
FIG. 5 is a plan view illustrating the interior of a liquid crystal apparatus according to a second embodiment as viewed from the front side.

FIG. 5 is the view showing the portion of the liquid crystal TV in the rear of the optical sheet as viewed from the front surface side of the liquid crystal TV.

Figure 6:
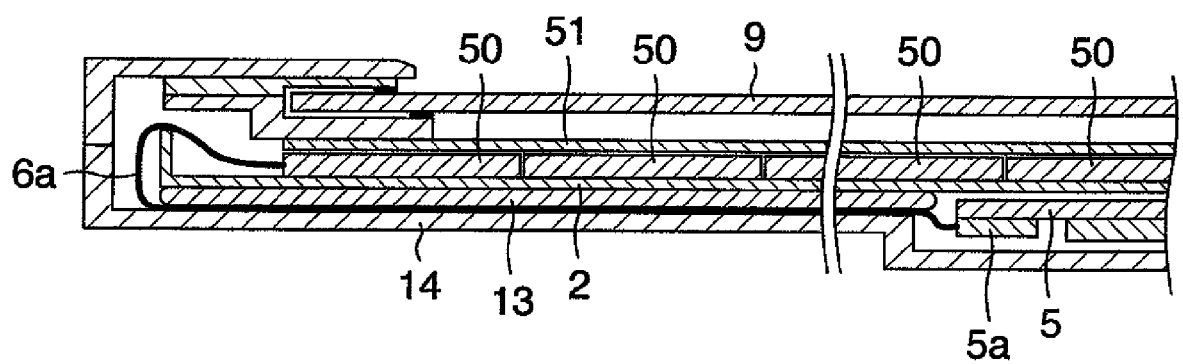
FIG. 6 is a partially enlarged view along line A-A in FIG. 5.

FIG. 6 is the sectional view of the liquid crystal TV along line A-A in FIG. 5.

In this embodiment, as shown in FIG. 5, the plane in the liquid crystal TV is divided into a plurality of zones in each of which a light source block 50 is arranged. The light source blocks 50 have the same configuration, and as shown in FIG. 6, are attached to a frame 2. On the front side of the light source blocks 50, an optical sheet 51 and a liquid crystal panel 9 are arranged. The configuration on the rear side of the frame 2 is similar to that in the first embodiment, and there are provided an LED driver substrate 5 for driving LEDs, a power source substrate, signal substrates, and a heat diffusion member 13 which is arranged to be isolated from the circuit boards. Power feed flexible cables 6a from the light source blocks 50 are bundled at each side end of the frame 2, are then led along the rear side of the frame 2 from its side end to pass between the heat diffusion member 13 and a rear case 14 and are connected to connectors 5a of a LED driver substrate 5.

Figure 7A:
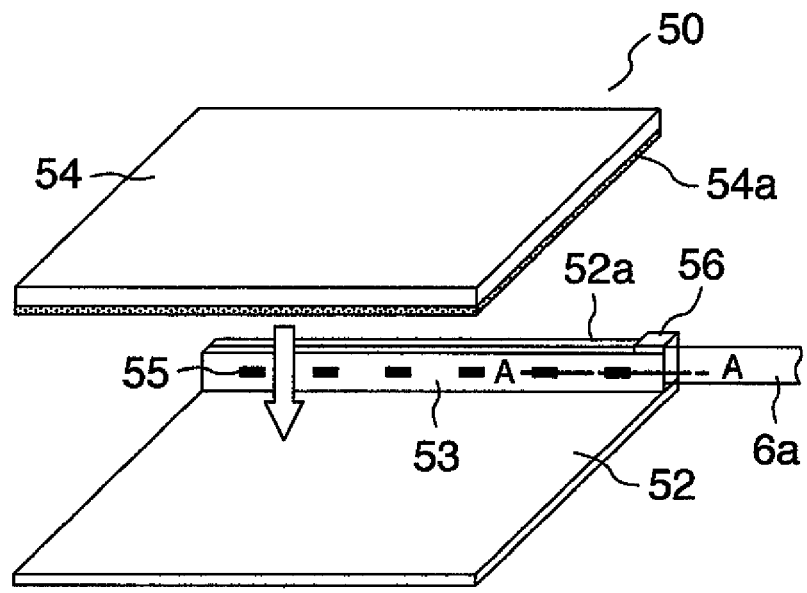
FIG. 7A is an exploded perspective view illustrating components of a light block in the second embodiment.
Figure 7B:
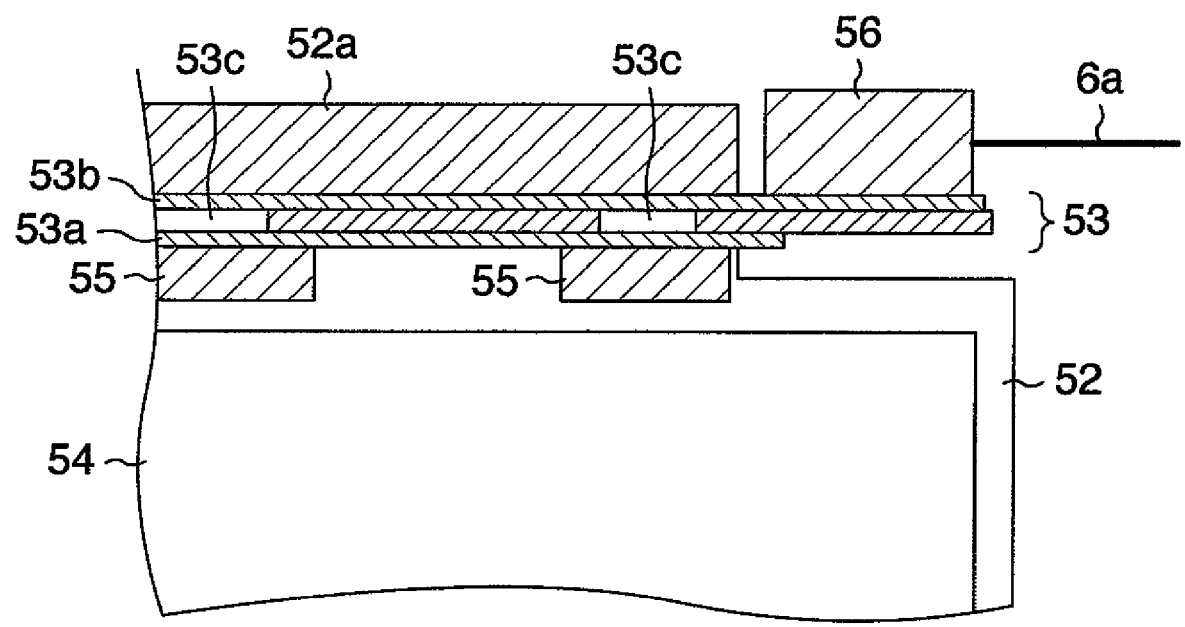
FIG. 7B is a sectional view along line A-A in FIG. 7A.

FIGS. 7A and 7B show the details of the light source block 50, in which FIG. 7B is the sectional view along line A-A in FIG. 7A.

Referring to FIG. 7A, the light source block 50 is composed of a subchassis 52 made of a high heat conductive metal sheet such as aluminum, a LED substrate 53 mounted thereon with a plurality of LEDs 55, a light guide panel 54, a reflection sheet 54a laid on the rear side of the light guide panel 54 and so forth. The LED substrate 53 is flexible, and is provided thereon with a copper wiring layer 53a on which the LEDs 55 are mounted by soldering, as shown in FIG. 7B. The copper wiring layer 53a is thermally connected to a copper wiring layer 53b laminated on the rear surface of the substrate through the intermediary of copper cores 53c. Heat generated from the LEDs 55 is transmitted through the copper cores 53c to the copper wiring layer 53b formed at the rear surface of the substrate. The LED substrate 53 is glued by a heat conductive adhesive to a cut and raised part 52a which is formed in an L-shape by cutting and raising a part of the subchassis 52. A part of the subchassis 52 where no cut and raise part is present is cut off so as to obtain a space in which a connector 56 is provided on the rear side of the LED substrate 53. The power feed flexible cables 6a led to the LED substrate 53 are bundled at the side end of the frame 2 through the connectors 56 and are then connected to the LED driver substrate 5. It is noted that the copper cores 53c also serve as power feed wiring layers connected to the LEDs 55.

With the above-mentioned configuration, the thermal resistance from the LEDs 55 to the subchassis 52 can be made small, the heat generated from the LEDs 55 can be efficiently transmitted to the subchassis 52, and it can be diffused within the subchassis 52. The heat generated from the LEDs 55 and diffused in the subchassis 52 is further diffused in the frame 2 and the heat diffusion member 13, and is then radiated into the outside air from the surface of the rear surface case 14. The diffusion member 13 may be not provided if the heat diffusion capabilities of the subchassis 52 and the fame 2 are sufficient for the heat value of the LEDs 55.

According to this embodiment, the number of rows of the light source blocks to be arranged may be increased according to the screen size of the display apparatus, and increasing of the screen size thereof can be simply made. Even in this case, the heat radiation from the LEDs can be efficiently made without blocking the heat transmission path from the LEDs to the rear side heat radiating part.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A liquid crystal display apparatus comprising a liquid crystal panel, a backlight device having a light source for illuminating the liquid crystal panel at a rear surface thereof, a heat diffusion member thermally connected to the light source, a plurality of circuit boards, a frame for holding the backlight device, the frame, the heat diffusion member, the circuit boards, and a flexible cable electrically connecting the light source to the circuit boards being received in a housing case having a rear surface which at least covers a rear surface of the liquid crystal display device, wherein the heat diffusion member and the circuit boards are laid at a rear of the frame, and the light source and the circuit boards are connected by the flexible cable which is led along an outer surface of the heat diffusion member and led between the heat diffusion member and the rear surface of the housing case.

2. The liquid crystal display apparatus according to claim 1, wherein the heat diffusion member and the plurality of circuit boards, which are laid at the rear of the frame, are arranged substantially in the same plane.

3. The liquid crystal display apparatus according to claim 1, wherein the flexible cable is led passing through a gap which is defined between the heat diffusion member and the rear surface of the housing case and which is extended in a direction along a rear of the liquid crystal apparatus.

4. The liquid crystal display apparatus according to claim 1, wherein the heat diffusion member is composed of a metal plate and a plurality of heat pipes thermally connected and secured to the metal plate.

5. The liquid crystal display apparatus according to claim 1, wherein the heat diffusion member comprises a planer member made of graphite and is secured to the frame through a metal member.

6. The liquid crystal display apparatus according to claim 1, wherein the rear of the liquid crystal panel is divided into a plurality of zones, and in each of the zones, a backlight device is arranged, which comprises a light source substrate mounted thereon with a light source, a light guide panel, a reflection sheet laid on a rear side of the light guide panel, and a metal chassis holding the light source substrate, and the light guide panel.

7. The liquid crystal display device according to claim 1, wherein the circuit boards which are connected to the light source by the flexible cable are arranged at a rear of the frame at a position spaced from an end of the heat diffusion member in a direction toward a center of the liquid crystal display device and spaced from the light source so as to prevent the circuit boards from being affected by thermal energy generated by the light source.

8. The liquid crystal display apparatus according to claim 7, wherein the light source is mounted at least proximate to an edge of the frame at a front of the frame, and the heat diffusion member is mounted at a rear of the frame proximate to the position of the light source and extends along the rear of the frame toward the center of the liquid crystal display device so that the end of the heat diffusion member is spaced from the circuit boards which lie substantially in a plane of the heat diffusion member.

* * * * *